(12) United States Patent
Pleskot

(10) Patent No.: US 6,688,695 B2
(45) Date of Patent: Feb. 10, 2004

(54) INCLINATION ADJUSTMENT LOCK FOR SEAT BACKS

(75) Inventor: Andrezej Pleskot, Poland (PL)

(73) Assignee: Faurecia Autositze GmbH & Co. KG, Stadthagen (DE)

( * ) Notice: Subject to any disclaimer, the term of this patent is extended or adjusted under 35 U.S.C. 154(b) by 0 days.

(21) Appl. No.: 10/104,652

(22) Filed: Mar. 22, 2002

(65) Prior Publication Data

US 2002/0171279 A1 Nov. 21, 2002

(30) Foreign Application Priority Data

May 16, 2001 (DE) .......................................... 101 23 800

(51) Int. Cl.⁷ .............................. B60N 2/02; F16H 55/14
(52) U.S. Cl. ....................... 297/366; 297/367; 297/368; 297/369; 297/370; 74/461
(58) Field of Search ................................. 297/366, 367, 297/368, 369, 370; 74/461, 462

(56) References Cited

U.S. PATENT DOCUMENTS

| | | | | |
|---|---|---|---|---|
| 1,525,642 A | * | 2/1925 | Cox ............................... | 74/462 |
| 2,906,143 A | * | 9/1959 | Musser ......................... | 74/640 |
| 4,355,846 A | * | 10/1982 | Kluting et al. ............... | 297/366 |
| 4,591,207 A | * | 5/1986 | Nithammer et al. ........ | 297/366 |
| 4,709,965 A | * | 12/1987 | Kazaoka et al. ............. | 297/366 |
| 5,328,241 A | * | 7/1994 | Haider ......................... | 297/367 |
| 5,535,640 A | * | 7/1996 | Qiu ............................... | 74/540 |
| 5,558,402 A | * | 9/1996 | Yamada ....................... | 297/363 |
| 5,685,611 A | * | 11/1997 | Eguchi et al. ............... | 297/367 |
| 5,934,753 A | * | 8/1999 | Lange .......................... | 297/367 |
| 6,273,508 B1 | * | 8/2001 | Lange .................... | 297/378.12 |
| 2002/0043853 A1 | * | 4/2002 | Shepard ...................... | 297/367 |
| 2002/0057008 A1 | * | 5/2002 | Shepard ...................... | 297/366 |

FOREIGN PATENT DOCUMENTS

| | | | |
|---|---|---|---|
| DE | 19709524 | 9/1998 | ...................... 2/22 |
| DE | 19859239 | 7/2000 | .................... 2/235 |
| GB | 2085959 A | * 5/1982 | ........... F16C/11/10 |
| JP | 2002345588 A | * 12/2002 | ........... A47C/1/025 |

\* cited by examiner

*Primary Examiner*—Peter M. Cuomo
*Assistant Examiner*—Sarah C. Burnham
(74) *Attorney, Agent, or Firm*—Bourque & Associates, P.A.

(57) ABSTRACT

In an inclination adjustment lock for partial areas of seats, such as seat backs, a first lock part is firmly attached to a first partial area and a second lock part is attached to a second partial area. Both partial areas are connected together so that they may pivot about a common pivot axis, and the second is mounted to the second partial area so that it may pivot about an axis parallel to the pivot axis, and so that it may be held via a locking pawl in a ratchet position. In the ratchet position, a toothed section of the second lock part engages with an opposing toothed section of the first lock part. The pressure angle of the tooth faces assuming increased loading conditions, such as during a crash, with the toothed section of the second lock part and their complementary opposing toothed section decreases as the separation from the axis 4a increases.

5 Claims, 7 Drawing Sheets

INCLINATION ADJUSTMENT LOCK FOR SEAT BACKS

FIELD OF THE INVENTION

The invention relates to an inclination adjustment lock for seat backs.

BACKGROUND OF THE INVENTION

In a known inclination adjustment lock of the type disclosed in DE 198 59 239 C1, a first lock part is firmly attached to a first partial area, and a second lock part is attached to a second partial area. The second lock part is mounted on an axis parallel to the pivot axis for the first partial area, and is held in a ratcheting position by means of a locking pawl, in which the second lock part engages by means of an opposing toothed area of the first lock part.

An intermediary toothed area is provided on the second lock part of the known inclination adjustment lock that is engaged with a first toothed area of an intermediary element. The intermediary element may be engaged and disengaged via a second toothed area finer than the first toothed area with a corresponding opposing toothed area of the first lock part. The intermediary element is mounted on a second lock part so that it may be moved to a limited extent perpendicular to the pivot direction and tangential to the first toothed area.

Provision of an intermediary element, i.e., provision of an additional component, is expensive. This expense is further increased by the fact that this intermediary element must be mounted on the second lock part so that it may move longitudinally in a certain manner. The expense caused by the known inclination adjustment lock was previously necessary to ensure that slippage of the engaged toothed areas is prevented even during high loads caused by crashes. A better attachment must thus be provided for the known inclination adjustment lock when a tangential displacement of the engaged toothed areas arises during a crash, and also when the corresponding deformation is no longer elastic, but rather plastic.

Inclination adjustment locks of the same type are known in which the first lock part is formed of a toothed segment rigidly attached to the seat back as in DE 197 09 524 A1. In this solution, the second lock part is a pivoting ratchet pawl whose toothed area may be pivoted to engage and disengage with the toothed part of the toothed segment. The ratchet pawl is held in the engaged position by a locking pawl that also pivots. In this known solution, the ratchet pawl is provided with a constricted area of lesser width between its pivot axis and the contact area of the locking pawl opposite the toothed area. In the known solution, this constriction serves to maintain the locked position between the interacting toothed areas during an elastic deformation such as may occur during pulsed loads. In the known solution, the teeth of the toothed areas held engaged are symmetrical, and have the same shape. In such toothed areas, the problem arises that, during a crash, the toothed area is not loaded equally, but rather the first tooth adjoining the load application point breaks off, as may a part of the second tooth. The remaining toothed area may then slip.

SUMMARY OF THE INVENTION

Based on the state of technology described above, the invention has the task of creating an inclination adjustment lock of the type described in the overall concept as simply as possible and from as few components as possible, and to make it so safe during increased loading situations, such as during a crash, that the engaged toothed areas are loaded equally, and that they remain engaged during the crash.

The present invention features An inclination adjustment lock for seat backs including a first lock part and a second lock part, one of which is firmly attached to a first seat back partial area and the other of which is attached to a second partial area of the seat back, whereby both partial seat back areas are connected together so that they may pivot about a common pivot axis. The second lock part (4) is mounted to the second partial seat back area (9b) so that it may pivot about an axis (4a) parallel to the pivot axis (3) and so that it may be held via a locking pawl (5) in a ratchet position in which a toothed section (4b) of the second lock part (4) engages with an opposing toothed section (2a) of the first lock part (2).

Utilizing the present invention. The pressure angles ($\alpha$, $\gamma$) of the tooth faces receiving increased loading conditions that are greater than at rest loading conditions, decrease to the toothed section (4b) of the second lock part (4) and on a complementary opposing toothed section (2a) as the separation from the axis (4a) increases.

In accordance with another feature of the present invention, the inclination adjustment lock includes tooth faces wherein each different tooth face of a tooth (2c; 2d; 2e and 4c; 4d; 4e; 4f) or of a corresponding tooth gap (4g; 4h; 4i and 2f; 2g; 2h; 2i) has a different pressure angle value ($\alpha$, $\beta$ or $\gamma$, $\delta$) during at rest load conditions and wherein unloaded faces all have the same pressure angle ($\beta$ or $\delta$) during increased loading conditions.

In one embodiment, there is a central plane between the faces of each tooth (2c, 2d, 2d, 2e), and wherein the central planes between the faces of each tooth (2c; 2d; 2e) intersect at a central point. In yet another embodiment, a thickness (d) of teeth adjacent to the tooth bases (2c; 2d; 2e or 4c; 4d; 4e; 4f) decreases as the separation from axis 4a increases.

The recommended solution takes into account the unequal loading situation of the teeth located at differing distances from the point where force is applied. Such a solution as provided by the present invention allows for an even distribution of the load to all engaged tooth faces that, with known prior art solutions, are borne by only one or two teeth during an increased load condition, such as during a crash.

BRIEF DESCRIPTION OF THE DRAWINGS

These and other features and advantages of the present invention will be better understood by reading the following detailed description, taken together with the drawings wherein.

Although the present invention will be explained in connection with an automobile seat, this is not a limitation of the present invention as the invention may be practiced with other types of seats and seat backs.

Figure 1:
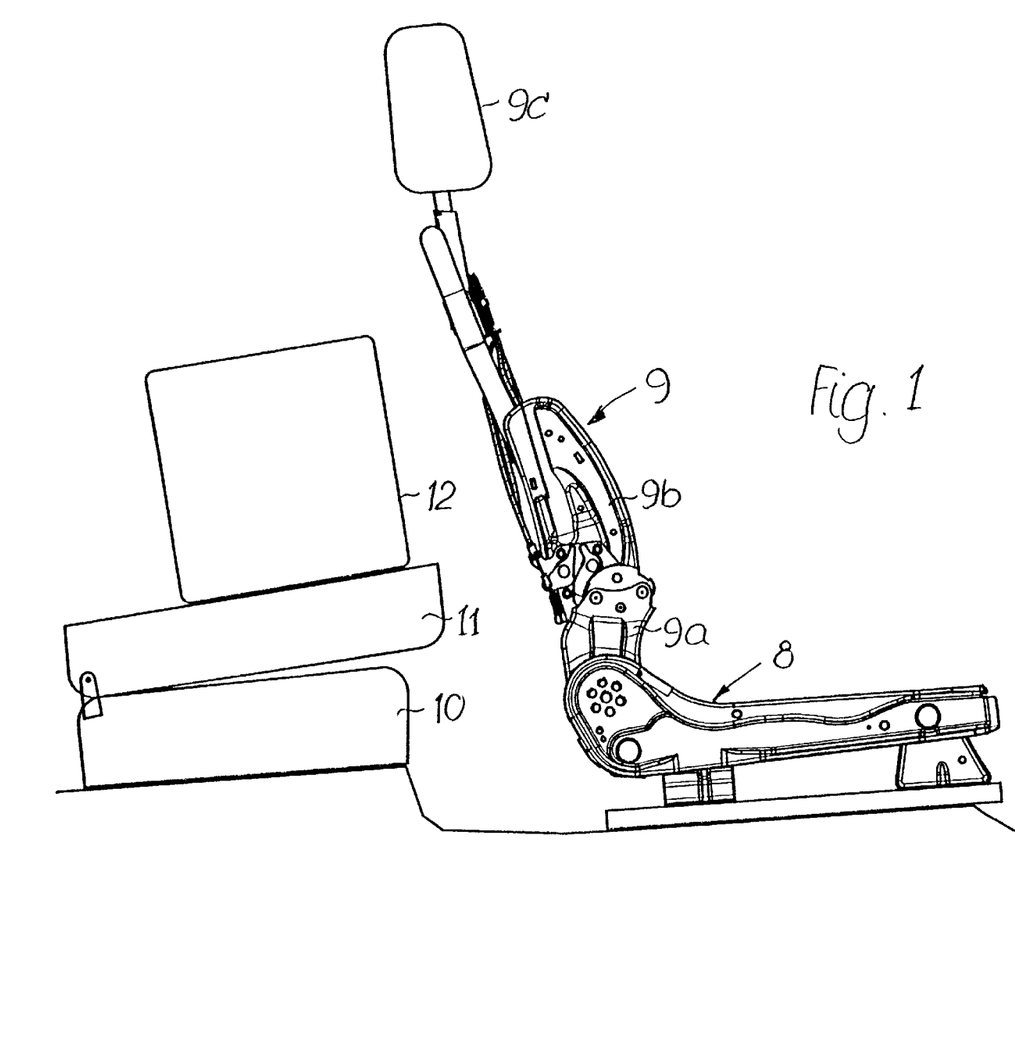
FIG. 1 is a schematic lateral view of a front seat with a rear seat indicated behind it with tilted seat back on which a piece of luggage is resting.

In an automobile with front and rear seats, the rear seat includes a rear seat body 10, FIG. 1, and a rear seat back 11 mounted to so that it may tilt forward. When the rear seat back 11 is tilted forward, the luggage compartment for luggage 12 is increased up to the rear side of the front seat. FIG. 1 shows the frame parts of the body 8 of the front seat and a seat back 9 on which a headrest 9c is mounted. The inclination of the seat back 9 is adjustable with respect to the seat body 8 by means of a rotating adjuster 8a. The seat back 9 may include a lower area 9a and an upper area 9b opposite it that may be tilted into a table position. When in the table position tilted about a pivot axis 3, the rear side of the upper part area 9b assumes a position that is almost horizontal.

Figure 2:
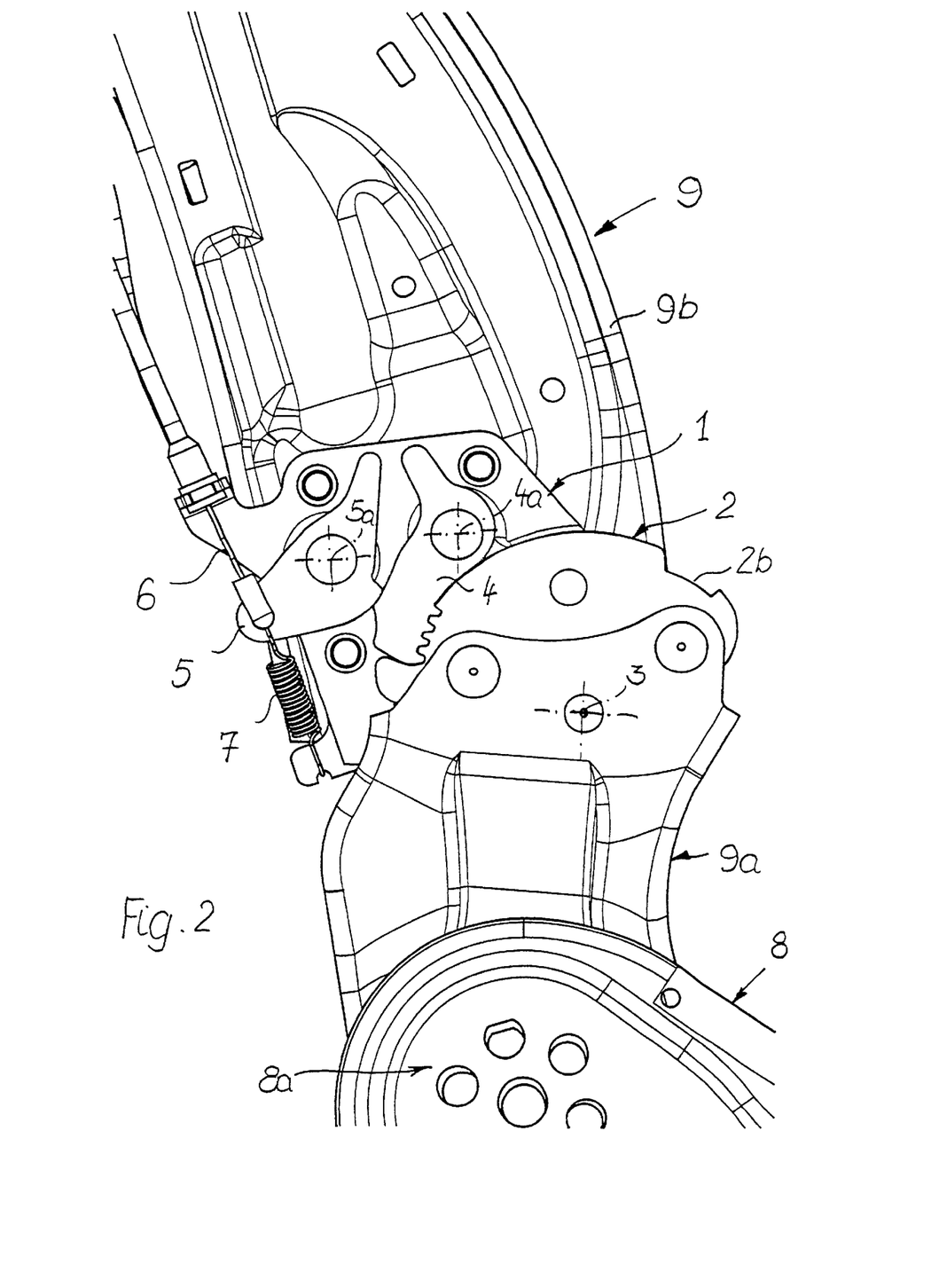
FIG. 2 is an enlarged partial representation of the lower area of the seat back and the rear upper area of the seat body.

FIG. 2 shows a first lock part 2 firmly attached to the lower portion 9a of the seat back 9. A second lock part 4 is mounted on the upper portion 9b via an adapter 1 so that it may pivot about an axis 4a parallel to the pivot axis 3. The lock part 4 is held engaged with the lock part 2 by a locking pawl 5. The locking pawl 5 is pre-tensioned by a Bowden cable about an articulated link axis 5a by a spring 7 that presses against the adapter 1 in the locking direction.

Figure 3:
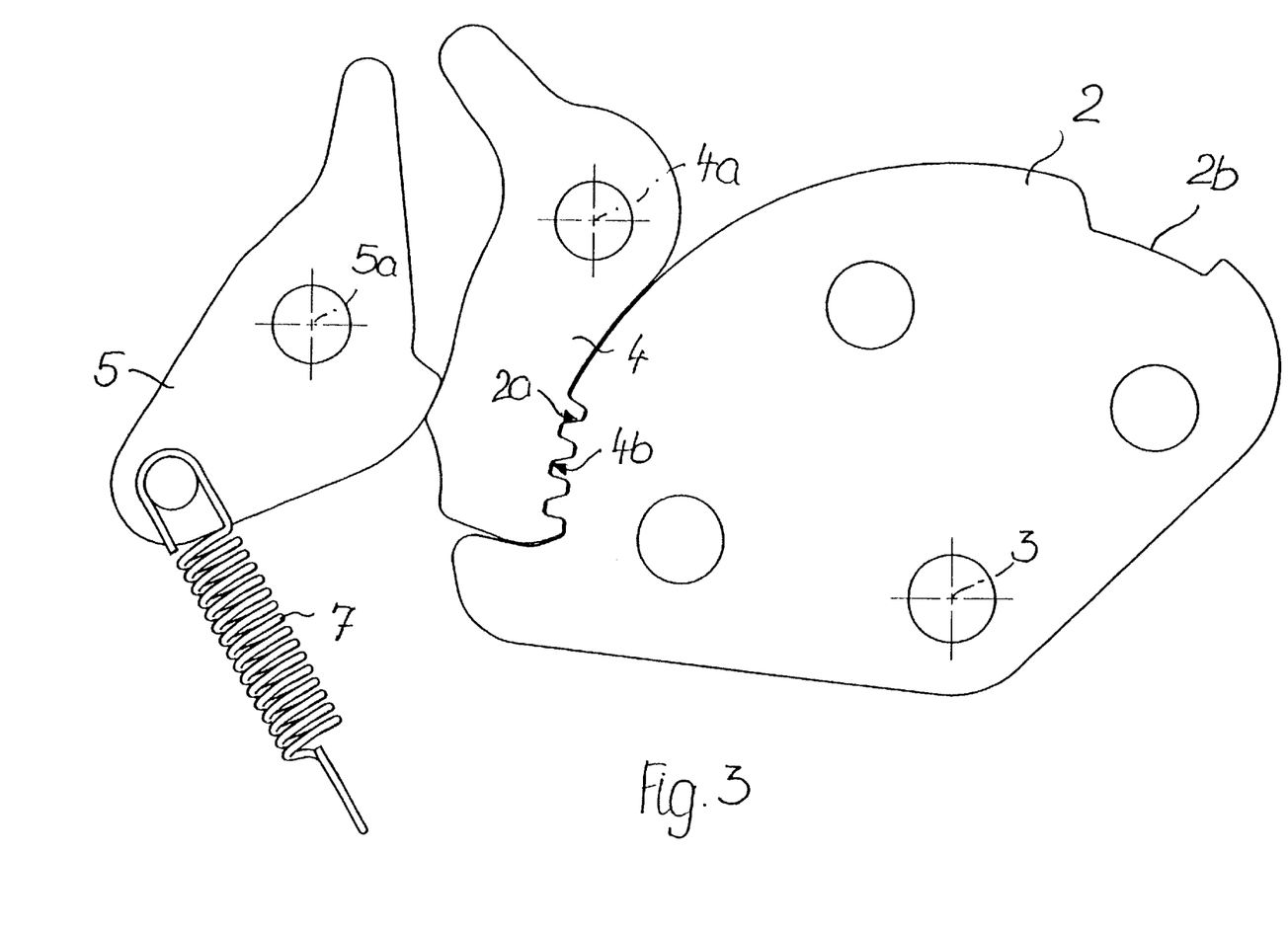
FIG. 3 is a schematic representation of the essential functional, engaged elements.

The lock part 4, FIG. 3, is provided with a toothed section 4b for the purpose of locking the upper partial area 9b with the lower partial area 9a in its upright position that engages with an opposing toothed section 2a on the first lock part 2. In the table position, the toothed section 4b ratchets in a non-toothed recessed section 2b. As FIG. 1 shows, the upper partial area 9b of the seat back 9 may be severely loaded by the inertia acting on a piece of luggage 12 in a forward direction during a frontal crash. In order to protect a seated person from this load, the toothed section 4b and its opposing toothed section 2a are formed to be very strong, and the mutual engagement to be very reliable.

Figure 4:
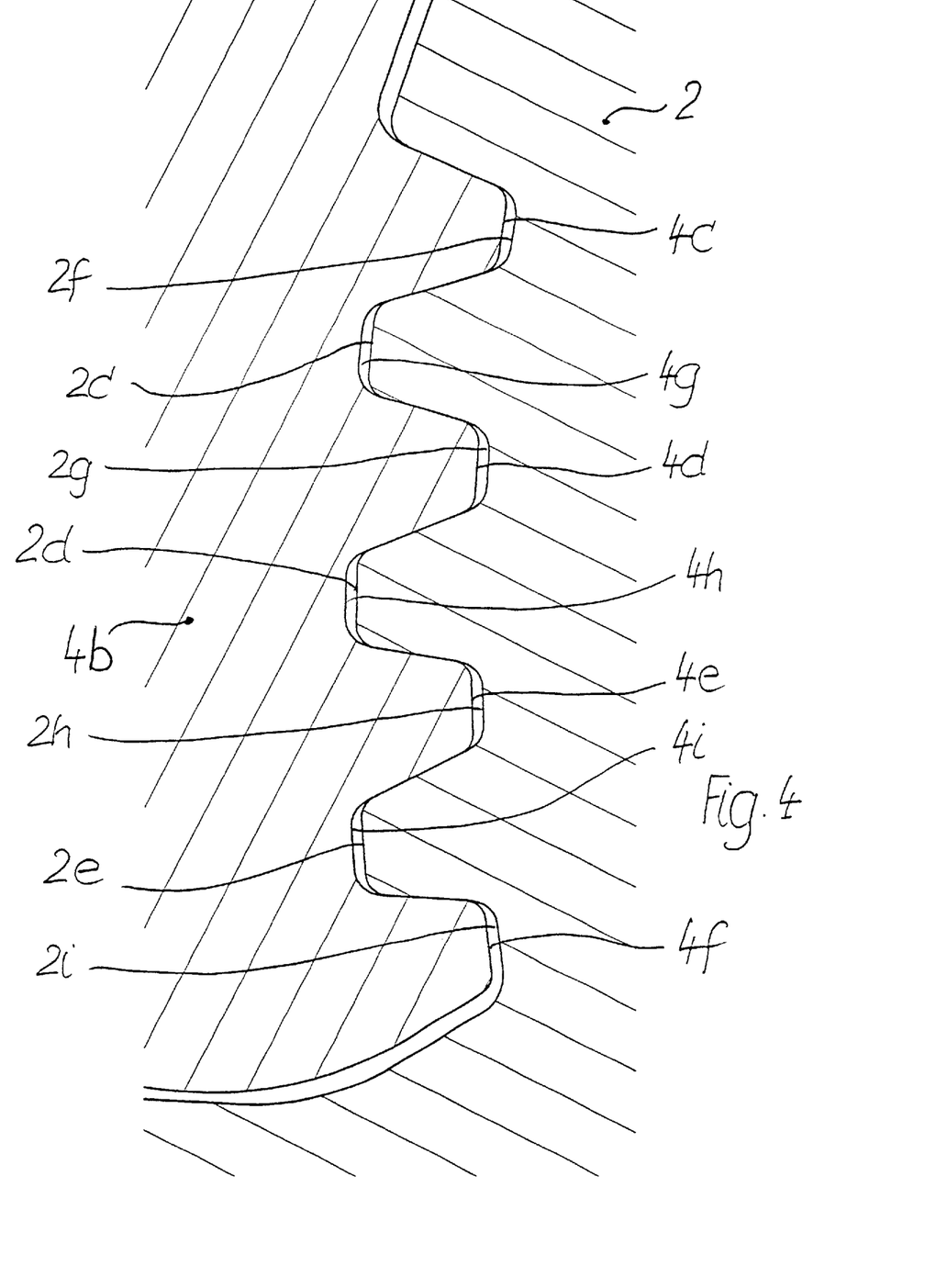
FIG. 4 is an enlarged cutaway view of the engaged toothed areas in normal position.

The toothed section 4b, FIG. 4, includes several teeth 4c, 4d, 4e, and 4f that fit into tooth gaps 2f, 2g, 2h, and 2i of the opposing toothed section 2a, and whose teeth 2c, 2d, 2e fit into tooth gaps 4g, 4h, 4i of the second lock part 4. The straight-line tooth faces with teeth 4c, 4d, 4e, and 4f facing the axis 4a possess an inclination, and the opposing surfaces of teeth 2c, 2d, and 2e possess a different inclination that is also different from that of the opposing surfaces of the same teeth. The surfaces of teeth 4c, 4d, 4e, and 4f facing away from axis 4a possess the same inclination, which is greater than the greatest inclination of the surfaces facing axis 4a. Thus, a broad tooth base width is achieved, the wear on the tooth faces is reduced, and the toothed sections 2a and 4b may be easily lifted.

Figure 5:
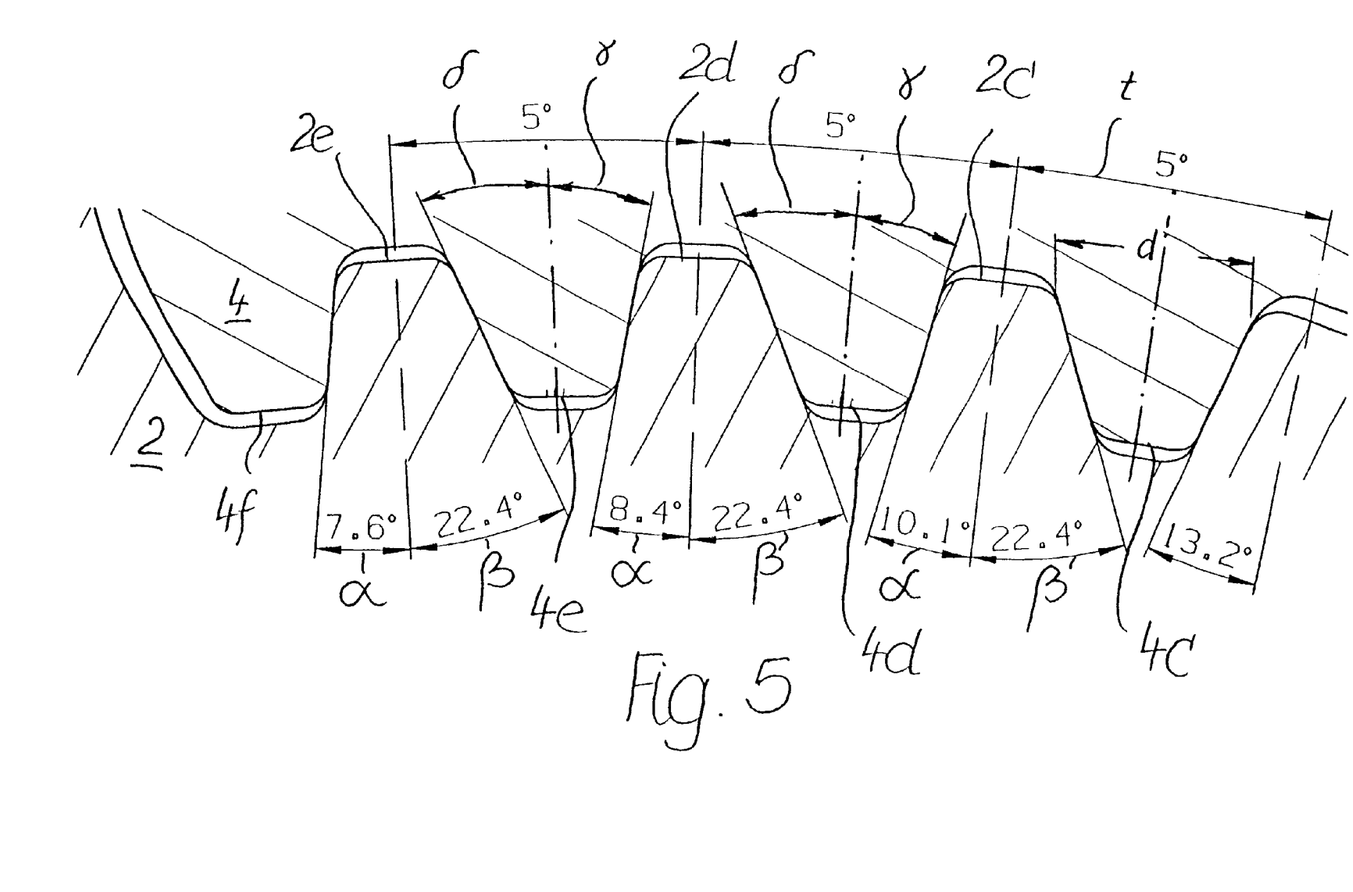
FIG. 5 is a representation per FIG. 4 with dimensions.

The toothed section 4b and the opposing toothed section 2a may be formed as a crown gear. In this case, the middle levels of the teeth lie parallel to each other. Thus, the gearing angle ($\gamma+\delta$) of tooth 4e, FIG. 5, is equal to the gearing angle ($\alpha+\beta$) of tooth 2d. Its pressure angle $\alpha$ of tooth 2c is equal to the pressure angle $\gamma$ of tooth 4e. The pressure angle $\alpha$ of tooth 2c is greater than the pressure angle $\alpha$ of tooth 2d, whose pressure angle is in turn greater than that of the tooth 2e. The pressure angles $\beta$ and $\delta$ have the same values for all teeth. Also, the gearing angles of the adjacent teeth 2d and 4d are the same.

FIG. 4 shows an arc-shaped toothed section 4b and opposing toothed section 2 in which the center planes meet at a common point, preferably at the pivot axis 3. The toothed section 4b is thus a segment of an inner-toothed section. In this case, the gearing angle ($\gamma+\delta$) is increased by an angular pitch t with respect to the gearing angle ($\alpha+\beta$).

Thus, the stability of the teeth 4c, 4d, 4e, and 4f is further increased during a crash.

Finally, the invention includes an arc-shaped toothed section that is not circular. In this case, there is no common intersection point for the center planes, and the pressure angle and the gearing angle depend on the curvature radius of the arc segment of any adjacent teeth.

The tooth gaps 2f, 2g, 2h, and 2i correspond to the shape of teeth 4c, 4d, 4e, and 4f. In the particularly advantageous embodiment shown in FIG. 5, the pressure angle $\alpha$ of the stiff tooth faces decreases from 13.2° to 7.6° as the distance from the axis 4a increases. The angle $\beta$ between the center plane of the teeth and the opposing tooth face is the same for all teeth of the lock part 2. In the same manner, the same angle $\delta$ applies for all teeth of the lock part 4.

Figure 6:
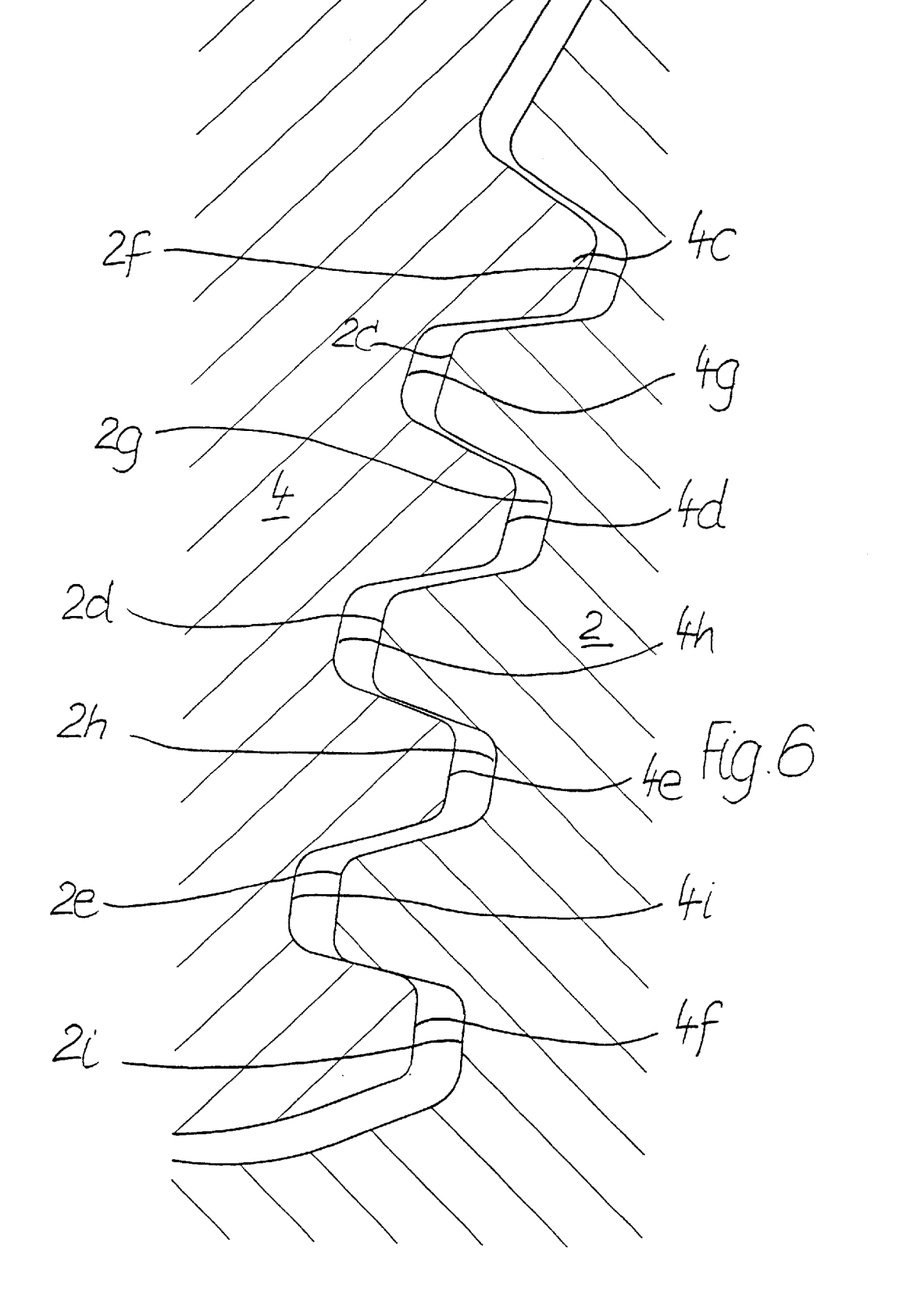
FIG. 6 is a representation of the engagement situation in the first stage of loading due to a crash.
Figure 7:
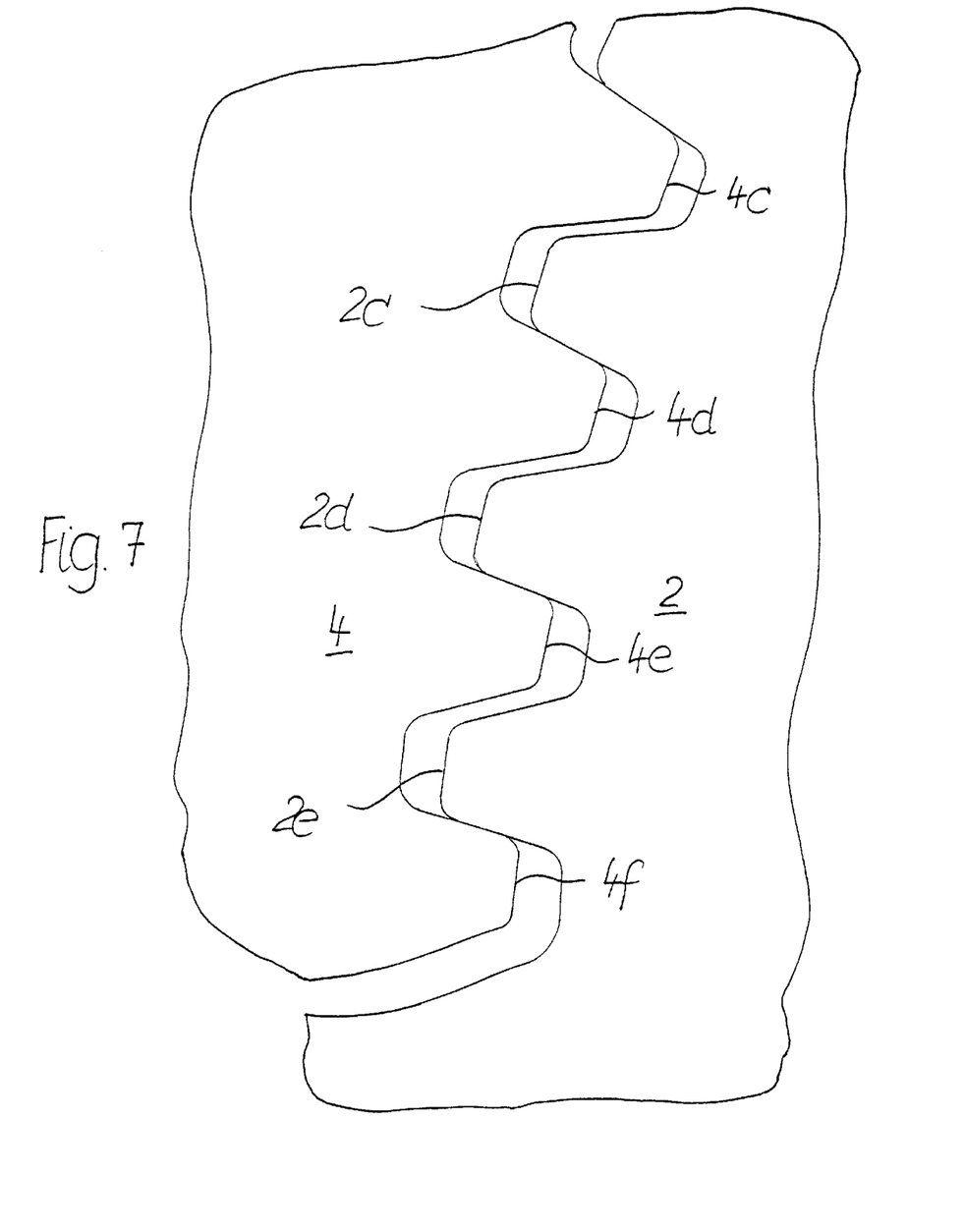
FIG. 7 is the engagement situation under increased loading with respect to FIG. 6.

Under load, the lock part 4 is displaced through the oblique tooth faces, and as a result of the unavoidable tolerances and elastic deformations of the components lying in the force flow path, that displacement is outward and radial to the pivot axis, as FIGS. 6 and 7 show. For theoretically fixed lock parts 2 and 4 in FIG. 6, the tooth 4f with the steepest face loses contact with the opposing face of tooth 2e. As the inclination of the tooth faces increases, the separation of the tooth faces facing each other increases, so that the face of tooth 4c has the greatest separation from its opposing face. The separations of the tooth faces are shown greatly magnified in FIG. 6. They lie practically in the area of the elastic longitudinal length alteration of the lock part 4 under load from a crash.

FIG. 7 shows the toothed section 4b and the opposing toothed section 2a with respect to arising expansions. The length alteration of the teeth 4c through 4f in the radial direction from the axis 4a resulting from the expansion is proportional to the separation of teeth 4c through 4f from this axis 4a, so that the tooth 4c is displaced less in this direction than is the tooth 4f. Also, the stiffness of the teeth decreases as the separation from axis 4b increases, since the tooth base thickness d is reduced resulting from the differing slope of the tooth faces. Thus, the corresponding tooth faces of all teeth 4c through 4f rest on opposing tooth faces when under load, and contribute approximately equally to the assumption of the load.

Modifications and substitutions by one of ordinary skill in the art are considered to be within the scope of the present invention, which is not to be limited except by the following claims.

What is claimed is:

1. An inclination adjustment lock for seat backs comprising: a first lock part and a second lock part, one of which is firmly attached to a first partial area and the other of which is attached to a second partial area, whereby both partial areas are connected together so that they may pivot about a common pivot axis, and said second lock part is mounted to the second partial area so that it may pivot about an axis parallel to the pivot axis and so that it may be held via a locking pawl in a ratchet position in which a toothed section of the second lock part engages with an opposing toothed section of the first lock part, wherein each of said plurality of teeth in said toothed section includes a gearing angle having a first pressure angle $\gamma$ and a second pressure angle $\delta$ and each of said plurality of teeth in said opposing tooth section includes a gearing angle having a first pressure angle $\alpha$ and a second pressure angle $\beta$, said first pressure angle $\alpha 1$ of a first tooth in said opposing tooth section being greater than said first pressure angle $\alpha 2$ of an adjacent tooth in said opposing tooth section, wherein the gearing angle $(\gamma+\delta)$ of said toothed section is approximately equal to said gearing angle $(\alpha+\beta)$ of opposing tooth section, said first pressure angle $\alpha$ of opposing tooth section is approximately equal to the first pressure angle $\gamma$ of said toothed section, and said second pressure angles $\beta$ and $\delta$ have approximately the same values for all teeth.

2. The inclination adjustment lock as in claim 1, wherein each different tooth face of a tooth or of a corresponding tooth gap has a different pressure angle value ($\alpha$, $\beta$ or $\gamma$, $\delta$).

3. The inclination adjustment lock as in claim 2, wherein unloaded faces all have the same pressure angle ($\beta$ or $\delta$) during increased loading conditions.

4. The inclination adjustment lock as in claim 1 wherein there is a central plane between each tooth, and wherein the central planes between each tooth intersect at a central point.

5. The inclination adjustment lock as in claim 1, wherein a thickness (d) of teeth adjacent to a base of the tooth decreases as a distance from the axis increases.

* * * * *